(12) United States Patent
Sato et al.

(10) Patent No.: US 9,216,472 B2
(45) Date of Patent: Dec. 22, 2015

(54) FRICTION STIR WELDING APPARATUS COMPRISING SLIDE PLATES

(75) Inventors: Tetsuro Sato, Toyokawa (JP); Yasuhiro Sakamoto, Toyokawa (JP); Tomonori Miyamichi, Toyokawa (JP); Toshiyuki Suda, Toyokawa (JP)

(73) Assignee: NIPPON SHARYO, LTD., Aichi (JP)

( * ) Notice: Subject to any disclaimer, the term of this patent is extended or adjusted under 35 U.S.C. 154(b) by 119 days.

(21) Appl. No.: 13/806,022

(22) PCT Filed: Oct. 14, 2011

(86) PCT No.: PCT/JP2011/073675
§ 371 (c)(1),
(2), (4) Date: Dec. 20, 2012

(87) PCT Pub. No.: WO2013/054441
PCT Pub. Date: Apr. 18, 2013

(65) Prior Publication Data
US 2014/0231490 A1    Aug. 21, 2014

(51) Int. Cl.
*B23K 20/12* (2006.01)

(52) U.S. Cl.
CPC ............. *B23K 20/123* (2013.01); *B23K 20/126* (2013.01); *B23K 20/1225* (2013.01)

(58) Field of Classification Search
CPC .......................... B23K 20/1255; B23K 20/122
See application file for complete search history.

(56) References Cited

U.S. PATENT DOCUMENTS

| | | | |
|---|---|---|---|
| 6,199,745 B1 * | 3/2001 | Campbell et al. | 228/112.1 |
| 6,237,835 B1 | 5/2001 | Litwinski et al. | |
| 6,758,382 B1 * | 7/2004 | Carter | 228/2.1 |
| 6,811,632 B2 * | 11/2004 | Nelson et al. | 156/73.5 |
| 6,865,919 B2 * | 3/2005 | Litwinski et al. | 72/256 |
| 7,234,625 B2 * | 6/2007 | Loitz et al. | 228/2.1 |
| 7,909,225 B2 * | 3/2011 | Henneboehle et al. | 228/2.1 |
| 8,052,028 B2 * | 11/2011 | Hall et al. | 228/2.1 |
| 8,079,276 B2 * | 12/2011 | Sylva et al. | 73/862.541 |

(Continued)

FOREIGN PATENT DOCUMENTS

| | | | | |
|---|---|---|---|---|
| JP | 2002192359 A | * | 7/2002 | ............ B23K 20/12 |
| JP | 2003-266181 A | | 9/2003 | |

(Continued)

OTHER PUBLICATIONS

English Machine Translation of JP 2008-149331 Mar. 7, 2008.*

(Continued)

*Primary Examiner* — Devang R Patel
*Assistant Examiner* — Carlos Gamino
(74) *Attorney, Agent, or Firm* — Sughrue Mion, PLLC

(57) ABSTRACT

A friction stir welding apparatus includes a rotating tool provided with an upper rotating body arranged to be axially adjustable in position by an upper actuator, a lower rotating body integral with a rotating main rod extending through the upper rotating body and arranged to be axially adjustable in position by a lower actuator, and a stirring part formed in the rod. The upper rotating body and the lower rotating body clamp therebetween a joint of members to be joined placed with their end faces butting each other. The stirring part is rotated to stir the joint by frictional heat to join them. The rotating tool includes a slide plate attached, through a thrust bearing, to one or both of end portions of the upper rotating body and the lower rotating body facing each other to provide good finished surfaces of the joint.

10 Claims, 9 Drawing Sheets

(56) References Cited

U.S. PATENT DOCUMENTS

| | | | |
|---|---|---|---|
| 8,893,951 B2 * | 11/2014 | dos Santos et al. | 228/2.1 |
| 2009/0120995 A1 * | 5/2009 | Hallinan et al. | 228/2.3 |
| 2009/0123778 A1 | 5/2009 | Russell et al. | |
| 2012/0193401 A1 * | 8/2012 | Hori et al. | 228/112.1 |

FOREIGN PATENT DOCUMENTS

| | | |
|---|---|---|
| JP | 2004-298900 A | 10/2004 |
| JP | 2004-358513 A | 12/2004 |
| JP | 2005-271084 A | 10/2005 |
| JP | 2006-015351 A | 1/2006 |
| JP | 2006-239778 A | 9/2006 |
| JP | 2008-149331 A | 7/2008 |
| JP | 2009-018312 A | 1/2009 |
| JP | 2009-537325 A | 10/2009 |
| JP | 2011-083799 A | 4/2011 |
| WO | WO 2009056759 A2 * | 5/2009 |
| WO | WO 2012171523 A2 * | 12/2012 |

OTHER PUBLICATIONS

European search report issued May 13, 2014 in counterpart EP Application 11873951.5.

* cited by examiner

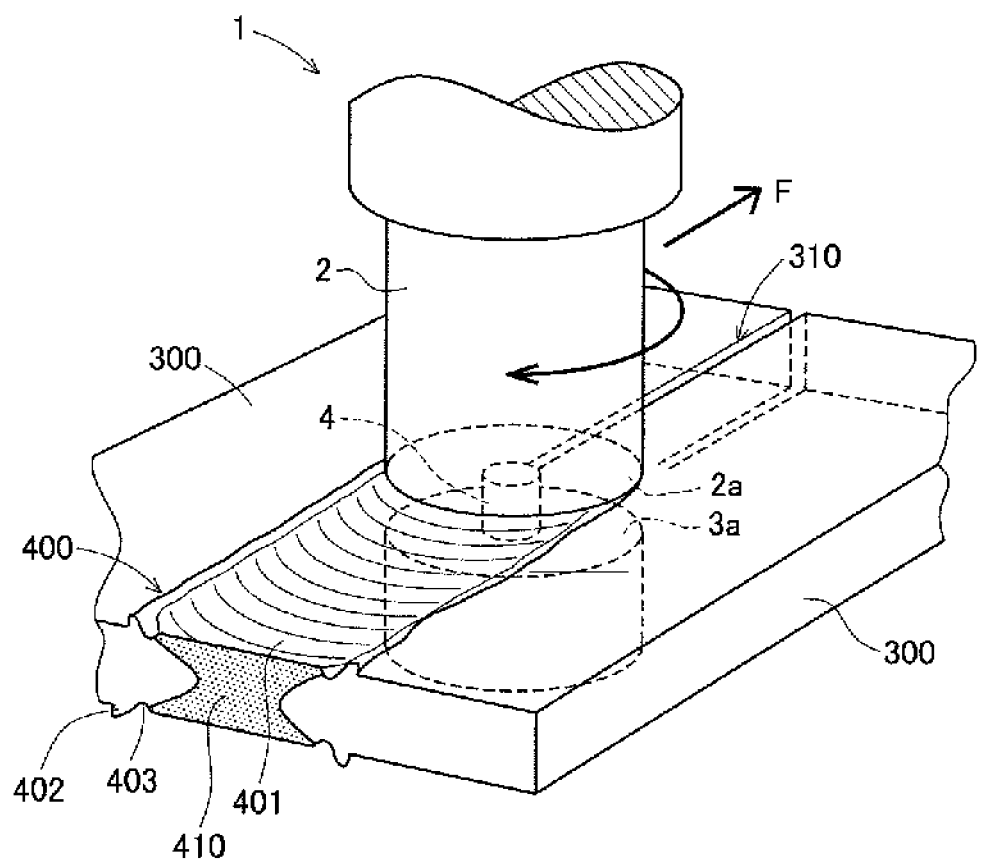
FIG. 3   Conventional

FRICTION STIR WELDING APPARATUS COMPRISING SLIDE PLATES

CROSS REFERENCE TO RELATED APPLICATIONS

This is a national phase application based on the PCT International Patent Application No. PCT/JP2011/073675 filed Oct. 14, 2011, the entire contents of which are incorporated herein by reference.

TECHNICAL FIELD

The present invention relates to a friction stir welding apparatus capable of controlling positions of an upper rotating body and a lower rotating body of a bobbin-type rotating tool and, more particularly, to a friction stir welding apparatus provided with a non-rotating member in a part in which the upper rotating body and the lower rotating body contact with members or pieces to be joined in order to improve a finished surface of a joint.

BACKGROUND ART

Friction stir joining has a problem that excess heating to members or pieces to be joined results in coarse joining quality. Patent Document 1 listed below therefore proposes a friction stir welding apparatus shown in FIG. 10. In a housing 110, a spindle 111 is supported rotatably through a bearing 112 and coupled to a drive motor not shown. A lower end of the spindle 111 is supported by a tool head bearing 113 fixed to the housing 110. A probe 115 located in a holder is connected with the spindle 111 and protrudes out through an opening 116 of a housing lower part 114. A non-rotating slide part 118 is supported in the opening 116 so that this slide part 118 slides on the surface of a joint without rotating during friction stir welding.

RELATED ART DOCUMENTS

Patent Documents

Patent Document 1: JP-A-2009-537325
Patent Document 2: JP-A-2008-149331

SUMMARY OF INVENTION

Problems to be Solved by the Invention

In such a conventional friction stir welding apparatus, a rotating tool has a fixed-pin configuration and the non-rotating slide part 118 is provided separately from the spindle 111. Thus, when position adjustment of the slide part 118 in up-and-down directions is required according to the surface shapes of the members to be joined, the friction stir welding apparatus has to be configured to move the whole housing 110. Further, the slide part 118 slides on the surface of the joint and a shoulder surface of the probe 115 does not plunge into the members to be joined. In case a gap is generated in the joint, accordingly, a material does not flow in the gap to fill it. This may cause a joining failure.

The present invention has been made to solve the above problems and has a purpose to provide a friction stir welding apparatus provided with a bobbin-type rotating tool in which a rotating body is movable up and down to achieve a good finished surface of a joint.

Means of Solving the Problems

To achieve the above purpose, one aspect of the invention provides a friction stir welding apparatus comprising a rotating tool including: an upper rotating body arranged to be adjustable in position in an axial direction by an actuator for upper rotating body; a lower rotating body formed integral with a rotating main rod extending through the upper rotating body and arranged to be adjustable in position in the axial direction by an actuator for lower rotating body; and a stirring part formed in the rotating main rod, the apparatus being configured such that the upper rotating body and the lower rotating body clamp therebetween a joint of members to be joined placed with their end faces butting each other and the stirring part is rotated to stir the joint by frictional heat to join the members, wherein the rotating tool includes a slide plate attached, through a thrust bearing, to one or both of end portions of the upper rotating body and the lower rotating body facing each other.

The above friction stir welding apparatus, preferably, further comprises: a load sensor to detect loads on the upper rotating body and the lower rotating body; a position sensor to detect positions of the upper rotating body and the lower rotating body; a position sensor to measure positions of the members to be joined; and a controller to execute load control to adjust the loads on the upper rotating body and the lower rotating body while clamping therebetween the joint and position control to adjust the positions of the upper rotating body and the lower rotating body.

In the above friction stir welding apparatus, preferably, the position sensor includes a displacement sensor to measure positions of upper surfaces of the members to be joined, when the slide plate of the rotating tool is attached to only the upper rotating body, the controller drives each of the actuators based on information from each of the sensors to perform the load control and the position control on the upper rotating body and perform only the load control on the lower rotating body.

In the above friction stir welding apparatus, preferably, the position sensor includes a displacement sensor to measure positions of upper surfaces of the members to be joined and a thickness sensor to measure a thickness of the joint of the members to be joined, when the slide plate of the rotating tool is attached to only the lower rotating body, the controller drives each of the actuators based on information from each of the sensors to perform the load control and the position control on the lower rotating body and perform only the load control on the upper rotating body.

In the above friction stir welding apparatus, preferably, the position sensor includes a displacement sensor to measure positions of upper surfaces of the members to be joined and a thickness sensor to measure a thickness of the joint of the members to be joined, when the slide plates of the rotating tool are attached to the upper rotating body and the lower rotating body, the controller drives each of the actuators based on information from each of the sensors to perform the load control and the position control on the upper rotating body and the lower rotating body.

In the above friction stir welding apparatus, preferably, the position control to be performed by the controller is configured to change the positions of the upper rotating body and the lower rotating body to follow the joint of the members to be joined in up-and-down directions.

In the above friction stir welding apparatus, preferably, the position control to be performed by the controller is configured to adjust the position of the upper rotating body or the lower rotating body allowed to further plunge into the joint of the members to be joined.

Effects of the Invention

According to the invention, one or both of the upper rotating body and the lower rotating body include a slide plate or slide plates. This enables joining without generating a weld mark on a surface or surfaces with which the slide plate or slide plates contact. Thus, surface finishing using a grinder or the like is no longer necessary after joining. The surface(s) can be nearly directly used as a product surface(s). Since no depression is generated, the joint of the members to be joined does not need to be formed with a protrusion in advance. This can reduce a machining cost and save a relevant work, resulting in a reduced product cost.

BRIEF DESCRIPTION OF THE DRAWINGS

FIG. 3 is a perspective view showing a joint subjected to friction stir welding using a bobbin-type rotating tool;

MODE FOR CARRYING OUT THE INVENTION

Figure 1:
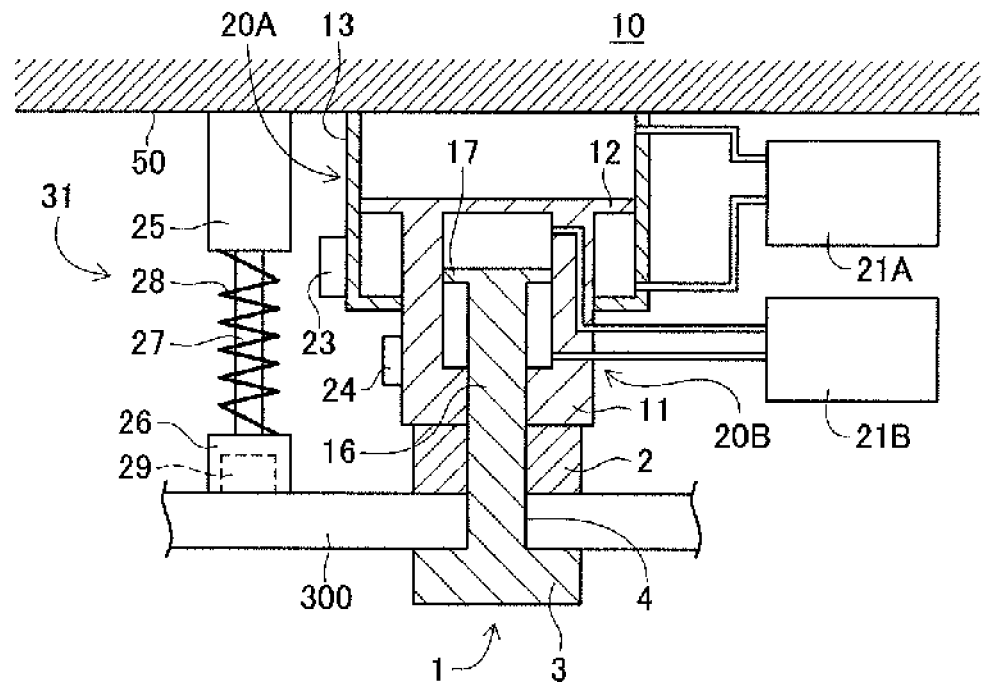
FIG. 1 is a conceptual diagram showing a structure of a friction stir welding apparatus in an embodiment.

A detailed description of a preferred embodiment of the present invention will now be given referring to the accompanying drawings. FIG. 1 is a conceptual diagram showing a structure of a friction stir welding apparatus in the present embodiment. This figure illustrates a side view of the apparatus seen in a direction perpendicular to a joining direction, in which a rotating tool 1 used for welding is moved leftward in the figure. In the present embodiment, two members to be joined (workpieces) 300, which are flat plates, are to be butt-welded together. FIG. 1 shows only one workpiece 300 located on a far side of the rotating tool 1 in the figure, and the other workpiece 300 located on a near side is not illustrated.

A friction stir welding apparatus 10 includes a rotating tool 1 to weld the workpieces 300. The rotating tool 1 includes an upper rotating body 2, a lower rotating body 3, and a stirring part 4. The upper rotating body 2 and the lower rotating body 3 can be independently adjusted in position in up-and-down directions. For this purpose, the friction stir welding apparatus 10 is provided with hydraulic cylinders.

For the upper rotating body 2, an upper hydraulic cylinder 20A is provided. The upper hydraulic cylinder 20A is configured such that the upper rotating body 2 and a cylinder-shaped rod 11 are provided integrally, and the rod 11 is formed at its upper end with a piston 12. To a base 50 located above the tool 1, a cylinder body 13 is fixed, in which the rod 11 is slidably inserted. A sliding portion of the rod 11 is treated for sealing so that the rod 11 is inserted air-tightly. In the cylinder body 13, a pressurizing chamber is formed which is partitioned into upper and lower sections by the piston 12. The rod 11 is extended and retracted according to supply and discharge of operating oil to the pressurizing chamber to adjust the position of the upper rotating body 2.

For the lower rotating body 3, a lower hydraulic cylinder 20B is provided. The lower hydraulic cylinder 20B is configured such that a cavity is formed in the cylinder-shaped rod 11 to define a cylinder section, in which a rotating main rod 16 is inserted. The main rod 16 is formed with the lower rotating body 3 and the stirring part 4. This main rod 16 is slidably inserted in the cylinder-shaped rod 11 placed coaxially with the main rod 16. A sliding part of the main rod 16 is treated for sealing so that the main rod 16 is inserted air-tightly. The main rod 16 is formed at its upper end with a piston 17. In the cylinder-shaped rod 11, the cavity forms a pressurizing chamber partitioned into upper and lower sections by the piston 17. The main rod 16 is extended and retracted according to supply and discharge of operating oil to the pressuring chamber to adjust the position of the lower rotating body 3.

Meanwhile, FIG. 1 illustrates only a configuration to adjust the positions of the upper rotating body 2 and the lower rotating body 3, but the friction stir welding apparatus 10 also includes a configuration to transmit rotational power. Specifically, the rotational output from a motor not shown is transmitted to the upper rotating body 2 of the tool 1. This rotation is further transmitted to the main rod 16 formed with a spline, thereby rotating the lower rotating body 3 and the stirring part 4 together with the upper rotating body 2.

The hydraulic cylinders 20A and 20B are connected respectively to hydraulic devices 21A and 21B. These hydraulic devices 21A and 21B are connected to a shared hydraulic pump and a shared tank or to separate hydraulic pumps and tanks, which are not shown. A hydraulic circuit is accordingly configured including predetermined fluid devices such as a switch valve used to supply and discharge hydraulic oil with respect to the hydraulic cylinders 20A and 20B. The positions of the upper rotating body 2 and the lower rotating body 3 are adjusted by driving of those hydraulic devices 21A and 21B. For checking the positions, the hydraulic cylinders 20A and 20B are provided respectively with stroke sensors 23 and 24 such as electromagnetic linear sensors to detect respective cylinder strokes. Load sensors 32A and 32B are respectively provided to detect loads on the upper rotating body 2 and the lower rotating body 3.

The friction stir welding apparatus 10 is further provided with a member measuring unit for measuring the position and the thickness of the workpiece 300 which is a member to be joined. In the present embodiment, there are provided a displacement sensor 25 to measure the position of an upper surface of the workpiece and a thickness sensor 29 to measure the thickness of the workpiece. Even though not illustrated, for example, the displacement sensor 25 is a differential transformer displacement sensor fixed to the base 50 and attached, at a lower end, with a contact element 26 through a movable rod 27. The contact element 26 is always urged downward by a coil spring 28 and is pressed against the upper surface of the workpiece 300 during friction stir.

The displacement sensor 25 includes a primary coil and a secondary coil each being wound in cylindrical form in which a magnetic core is inserted to be movable up and down together with the rod 27. The rod 27 is moved up and down in association with the contact element 26 contacting with the workpiece 300, thereby moving the magnetic core, which changes mutual inductance between the coils and generates a voltage difference therebetween. The contact element 26 is provided with the thickness sensor 29 consisting of an ultrasonic transmitter-receiver device. The displacement sensor 25 and the thickness sensor 29 are located ahead of the rotating tool 1 in a forward-moving direction and provided respectively in right and left workpieces 300.

Figure 2:
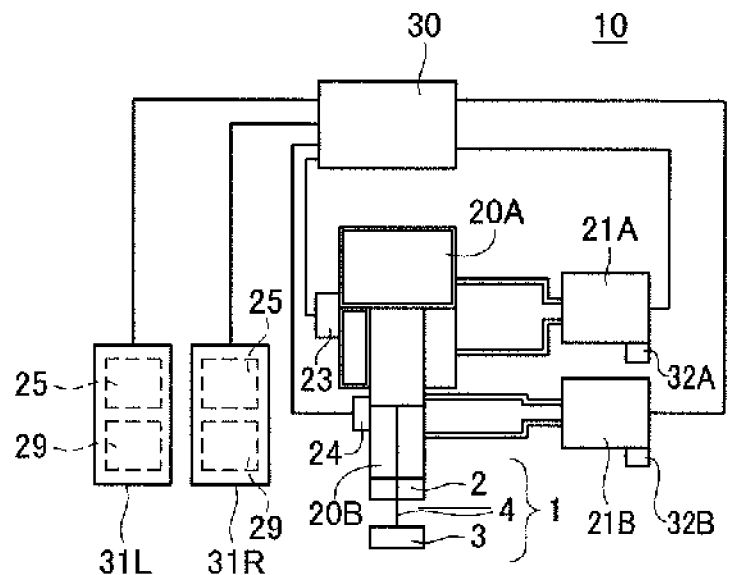
FIG. 2 is a block diagram showing the friction stir welding apparatus in the embodiment.

FIG. 2 is a block diagram showing the friction stir welding apparatus 10. This apparatus 10 includes a controller 30 to control the hydraulic devices 21A and 21B. The controller 30 is connected to the stroke sensors 23 and 24 of the hydraulic cylinders 20A and 20B and member measuring units 31R and 31L. The controller 30 stores a control program to adjust the positions of the upper rotating body 2 and the lower rotating body 3 of the rotating tool 1 in order to control extension and retraction of the hydraulic cylinders 20A and 20B. It is to be noted that a reference sign with a suffix "R" represents a component located on the right side with respect to the forward-moving direction and a reference sign with a suffix "L" represents a component located on the left side. In a case where reference signs having no suffix "R" or "L" and right and left components are identical in configuration, those reference signs indicate both of right and left components. The same applies to the following description.

In the friction stir welding apparatus 10, a hydraulic sensor is provided in a hydraulic circuit forming the hydraulic devices 21A and 21B. A detection value of the hydraulic sensor is transmitted to the controller 30 to control constant loads to be applied to the upper rotating body 2 and the lower rotating body 3 clamping the workpieces 300 therebetween. To be concrete, the control is executed to adjust the loads for example at a load value of 1 kN so that the downward pressing force of the upper rotating body 2 on the upper surfaces of the workpieces 300 and the upward pressing force of the lower rotating body 3 on the lower surfaces of the workpieces 300 are balanced with each other.

In the friction stir welding apparatus 10, further, position control of the upper rotating body 2 and the lower rotating body 3 is performed in addition to the above load control. In the case of controlling the loads to be constant, causing excessive heat input, the workpieces 300 lose a load support force against the upper rotating body 2 and the lower rotating body 3 and thus may be thinned down with a smaller thickness than a threshold. Therefore, the position control of the upper rotating body 2 and the lower rotating body 3 is performed in addition to the load control in order to prevent the upper rotating body 2 and the lower rotating body 3 from plunging into the workpieces 300 more deeply than a certain value even when thermal characteristic changes become unstable.

The rotating tool 1 used in the friction stir welding apparatus 10 is a so-called bobbin-type tool configured to rotate the upper rotating body 2 and the lower rotating body 3 while clamping the workpieces therebetween. The upper rotating body 2 is rotated upon receipt of power from the motor not shown and the rotation of the rotating body 2 is transmitted to the main rod 16, thereby rotating the stirring part 4 and the lower rotating body 3 together. FIG. 3 is a perspective view showing a joint during friction stir welding using the bobbin-type rotating tool.

When a shoulder surface 2a of the upper rotating body 2 and a shoulder surface 3a of the lower rotating body 3 are rotated in contact with the workpieces 300, a weld mark 400 is generated on the surfaces of the workpieces 300. This weld mark 400 is formed as below. As the rotating tool 1 is moved forward in a direction F, a bead portion 401 having semicircular streaks in a stripe pattern is formed on the trail of the tool 1. In the bead portion 401, the streaks form protrusions and depressions even though they are microscopic. On both of right and left sides of the bead portion 401, slight depressions 403 are formed inside burrs 402 which are generated when the softened and flowed material is extruded out by the upper rotating body 2 and the lower rotating body 3. After joining, therefore, it is necessary to smooth the surfaces of the workpieces 300 by reducing or removing the bead portion 401 and the burrs 402. Accordingly, a surface finishing work for example using a grinder or the like is performed. To smooth the surfaces without leaving the depressions 403 at that time, the workpieces 300 have to be processed in advance to make a thick joint 310.

In the joint 310 after joining, a thermo-mechanically affected zone 410 is formed in a plastic flow region. In this thermo-mechanically affected zone 410, the material is plastically deformed and flows under a high temperature below a melting point and thus receives large stress due to deformation during joining. This is because when the material present in front of the stirring part 4 is plastically deformed and flows backward, the material is divided by the stirring part 4 and passes through right and left narrow regions at a higher speed than a travel speed of the rotating tool 1. Thus, the strength of the thermo-mechanically affected zone 410 lowers. In friction stir welding, therefore, this region is preferably as narrow as possible.

Figure 4:
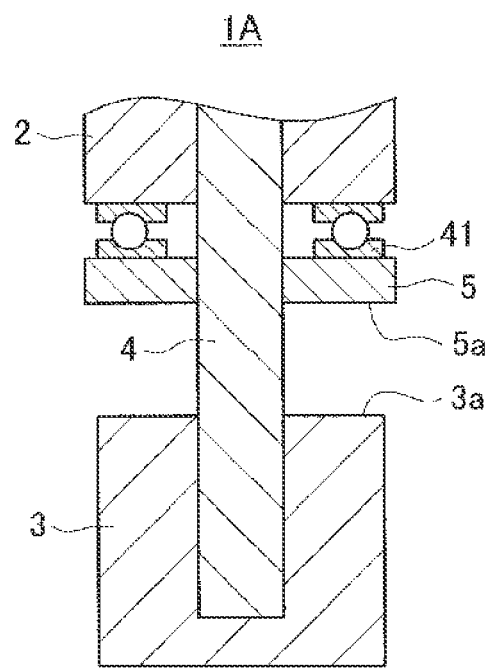
FIG. 4 is an enlarged cross sectional view of a first type of the rotating tool.
Figure 5:
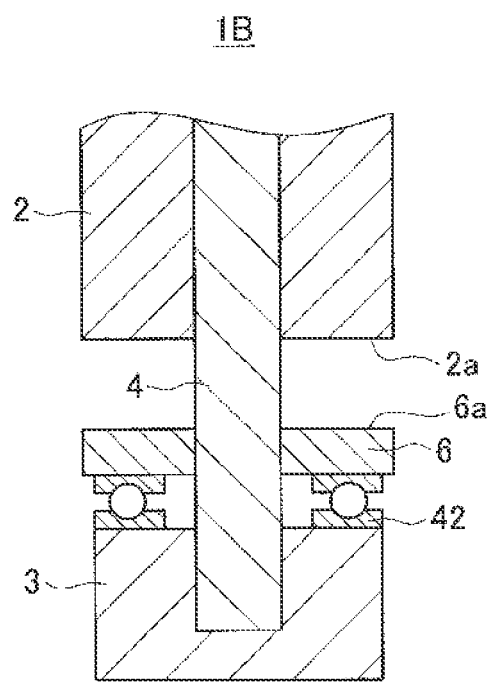
FIG. 5 is an enlarged cross sectional view of a second type of the rotating tool.
Figure 6:
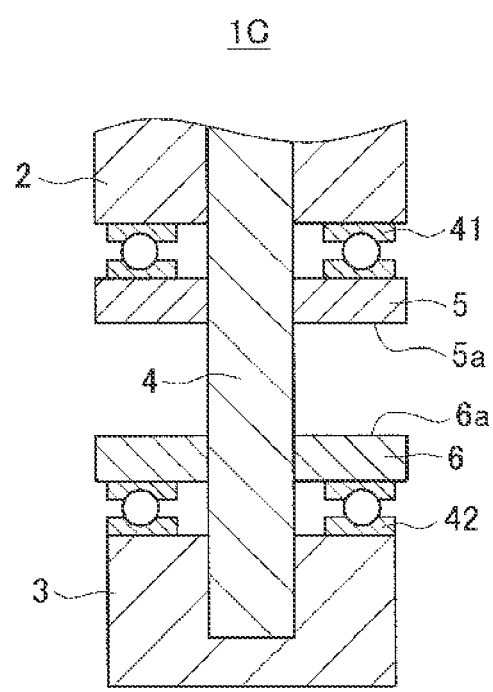
FIG. 6 is an enlarged cross sectional view of a third type of the rotating tool.

To prevent generation of the weld mark 400 and narrow the region of the thermo-mechanically affected zone 410, the friction stir welding apparatus 10 includes the rotating tool 1 characterized as below. FIGS. 4-6 are enlarged cross sectional views of three types of rotating tools 1. Focusing on shoulder surfaces for directly clamping the workpieces 300, rotating tools 1A, 1B, and 1C are respectively formed with shoulder surfaces that do not rotate together with the upper rotating body 2 and the lower rotating body 3. Specifically, when the shoulder surface is rotated, generating heat in the joint, the material of surface portions of the workpieces 300 is caused to plastically flow. The weld mark 400 and the thermo-mechanically affected zone 410 thus come about. From this point of view, it is intended to prevent heat generation caused by rotation of the upper rotating body 2 and the lower rotating body 3.

The rotating tool 1A of a first type shown in FIG. 4 is configured such that an upper slide plate 5 is attached to a lower end of the upper rotating body 2 through a thrust bearing 41. In contrast, the rotating tool 1B of a second type shown in FIG. 5 is configured such that a lower slide plate 6 is attached to an upper end of the lower rotating body 3 through a thrust bearing 42. The rotating tool 1C of a third type shown in FIG. 6 is configured by a combination of the first and second types, in which the upper slide plate 5 is attached to the lower end of the upper rotating body 2 through the thrust bearing 41 and the lower slide plate 6 is attached to the upper end of the lower rotating body 3 through the thrust bearing 42.

The upper rotating body 2 and the lower rotating body 3 serve to hold down the material of a plastically flowing portion heated and allowed to flow, thereby preventing escape of the material. In the friction stir welding, the stirring part 4 acts uniformly on the workpieces 300 in a thickness direction thereof to generate heat particularly in a contact portion most needing energy. This causes plastic flow of the material and enable welding. It is accordingly preferable not to rotate the upper rotating body 2 and the lower rotating body 3.

Figure 10:
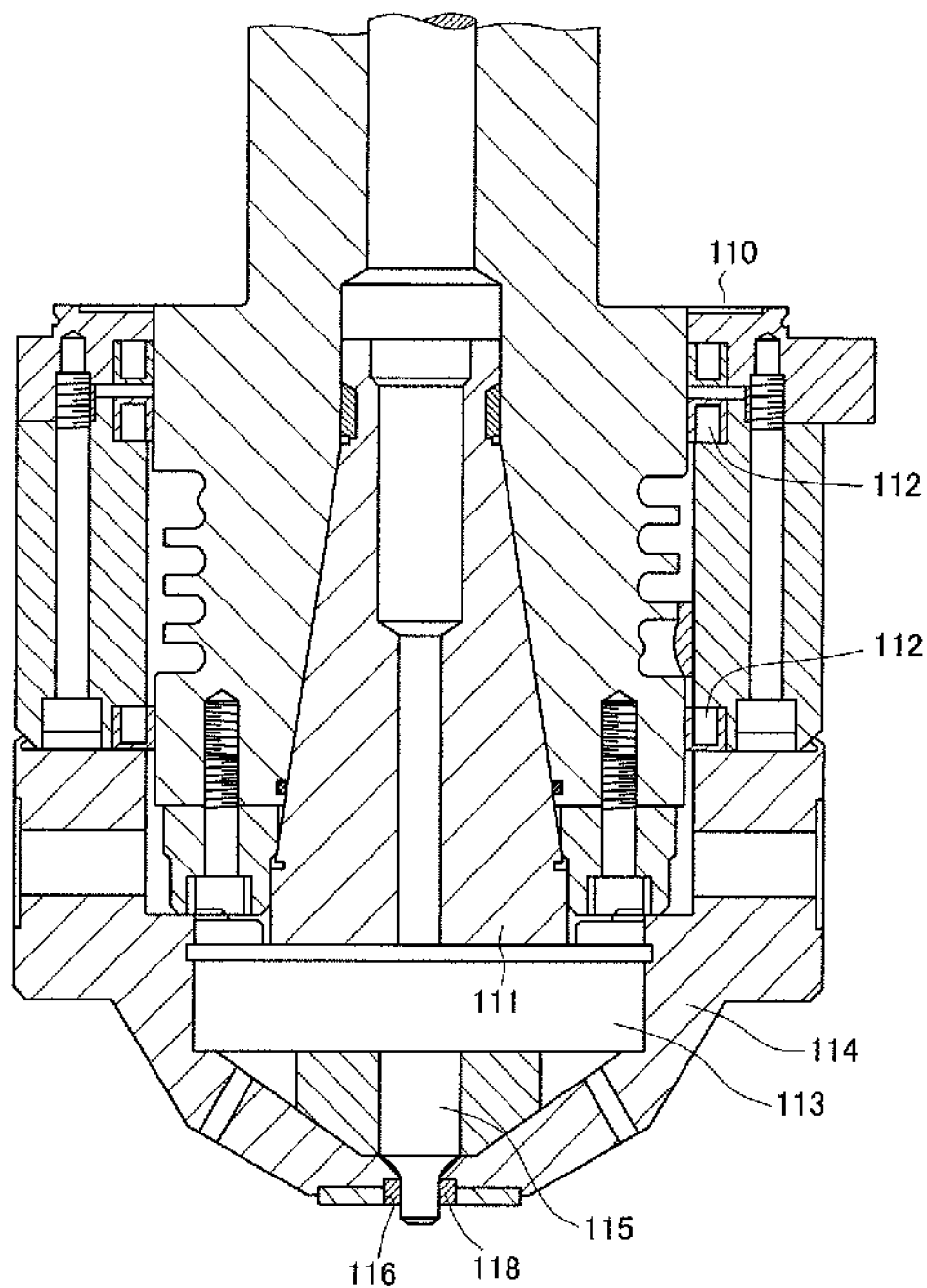
FIG. 10 is a cross sectional view showing a part of a conventional friction stir welding apparatus.

However, the friction stir welding apparatus 10 is configured to rotate the upper rotating body 2 and the lower rotating body 3 together with the rotating main rod 16 including the stirring part 4. Further, the upper rotating body 2 and the lower rotating body 3 are moved up and down during the load control and the position control. This cannot be achieved by such a configuration that the slide part 118 is attached to the housing lower part 114 as the conventional example shown in FIG. 10. Therefore, each of the rotating tools 1A, 1B, and 1C is provided with the upper slide plate 5 and/or the lower slide plate 6 in order to enable the load control and the position control of the upper rotating body 2 and the lower rotating body 3 and to block transmission of rotation of the shoulder surfaces contacting with the workpieces 300.

The operations of the friction stir welding apparatus 10 will be explained below. The rotating tool 1 rotates and moves while the upper rotating body 2 and the lower rotating body 3 clamp the joint 310 therebetween. In the joint 310 (see FIG. 3) at which end faces of the workpieces 300 are in butting contact with each other, heat is generated by rotation of the stirring part 4, thereby causing plastic flow of the material to join the portions. At that time, the upper rotating body 2 and the lower rotating body 3 press against the joint 310 from above and below at a constant load to prevent the heated material from flowing out.

Figure 7:
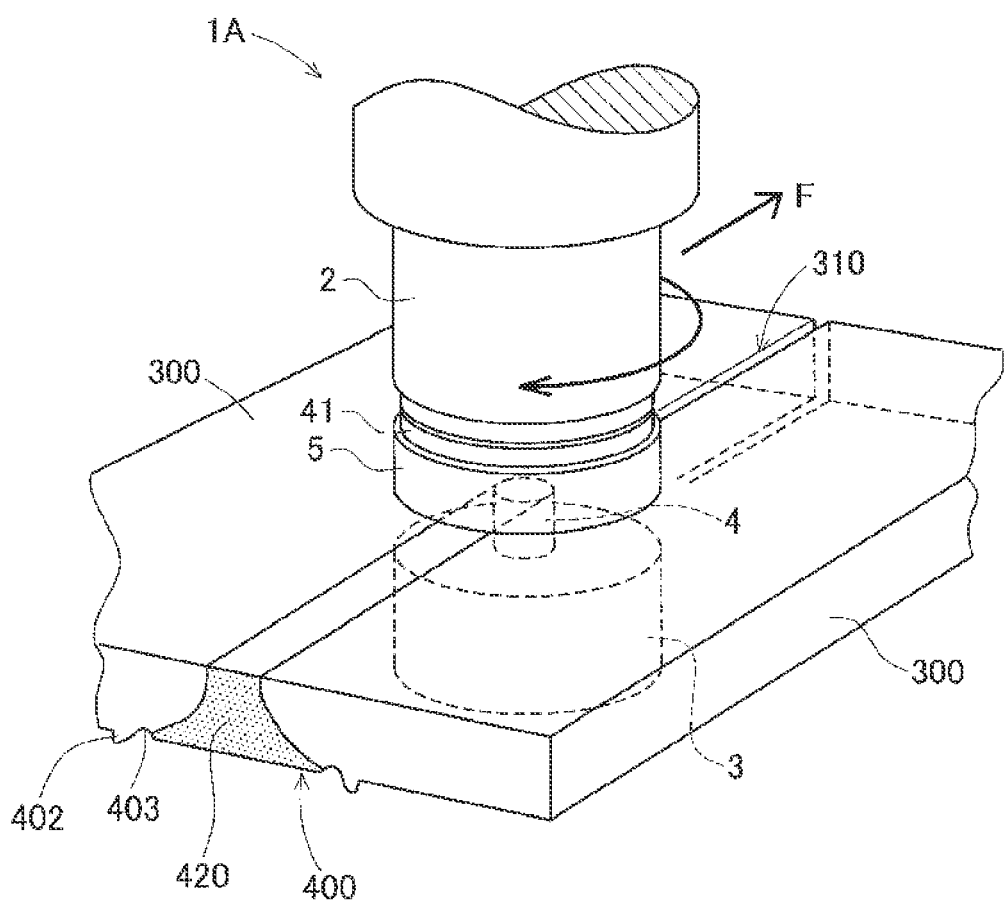
FIG. 7 is a perspective view showing a joined state during friction stir welding using the first-type rotating tool.

In the case where the above friction stir welding is conducted using the friction stir welding apparatus 10 with the rotating tool 1A shown in FIG. 4, the upper rotating body 2, the lower rotating body 3, and the stirring part 4 are rotated during friction stir welding, but the upper slide plate 5 contacting with the upper surfaces of the workpieces 300 is in non-rotational state. In other words, the thrust bearing 41 isolates the upper slide plate 5 from the rotation of the upper rotating body 2. Even if the slide plate 5 is co-rotated slightly by the rotation of the upper rotating body 2, the slide plate 5 is not so rotated as to generate heat in the surface of the joint 310. Accordingly, the upper slide plate 5 slides on the surface of the joint 310 while remaining in a non-rotational state. FIG. 7 is a perspective view showing a joining state during friction stir welding performed by use of the rotating tool 1A.

In the friction stir welding using the rotating tool 1A, the upper surface and the lower surface of the joint 310 are differently finished. On the lower surface of the joint 310 with which the rotating lower rotating body 3 directly contacts, the weld mark 400 (see FIG. 3) comes about similarly as before. To be concrete, the bead portion 401 is formed in a stripe pattern and the burrs 402 are generated on both sides of the bead portion 401 in its width direction, and further slight depressions 403 are formed inside the burrs 402 by the material flowing outside as burrs.

On the other hand, the upper slide plate 5 directly contacting with the workpieces 300 is not rotated, so that heat generation in the upper surface of the joint 310 is prevented. Thus, no plastic flow region is generated by the upper rotating body 2. This results in formation of a thermo-mechanically affected zone 420 as illustrated in the figure. In other words, plastic flow of the material is caused only by heat generated by rotation of the stirring part 4 and the lower rotating body 3. Comparing with the thermo-mechanically affected zone 410 shown in FIG. 3, the material is not expanded to the upper surface side and therefore the region of the thermo-mechanically affected zone 420 is narrower. Further, since the upper slide plate 5 presses the material without rotating, the upper surface of the joint 310 becomes a flat smooth surface having no burrs and depressions such as in the weld mark 400 shown in FIG. 3.

In the case of using the rotating tool 1B shown in FIG. 5, the upper rotating body 2, the lower rotating body 3, and the stirring part 4 are rotated during friction stir welding, whereas the lower slide plate 6 contacting with the lower surfaces of the workpieces 300 is held in non-rotational state. Accordingly, the lower slide plate 6 slides on the surface of the joint 310 while remaining in non-rotational state as with the upper slide plate 5 mentioned above. The joint 310 after joining is obtained in a reversed state to the case shown in FIG. 7. That is, in the upper surface with which the rotating upper rotating body 2 contacts, the weld mark 400 (see FIG. 3) is formed as in the conventional one, whereas the lower surface becomes a flat smooth surface having no burrs and depressions. The shape of a thermo-mechanically affected zone is also reversed to the shape of the thermo-mechanically affected zone 420 shown in FIG. 7.

The rotating tool 1A and the rotating tool 1B configured as above are preferably applied to the case where one of upper and lower surfaces of the workpieces 300 forms a design surface which will come under observation. On the other hand, in the case where both surfaces of the workpieces 300 are to form design surfaces, the rotating tool 1C shown in FIG. 6 is used. In the case of the rotating tool 1C, the upper rotating body 2, the lower rotating body 3, and the stirring part 4 are rotated during friction stir welding, whereas the upper slide plate 5 and the lower slide plate 6 held in contact with the workpieces 300 are in non-rotational state. Specifically, the thrust bearings 41 and 42 block the rotation. Even if the slide plates 5 and 6 are co-rotated slightly, the slide plates 5 and 6 slide on the surface of the joint 310 while remaining in almost non-rotational state.

Figure 8:
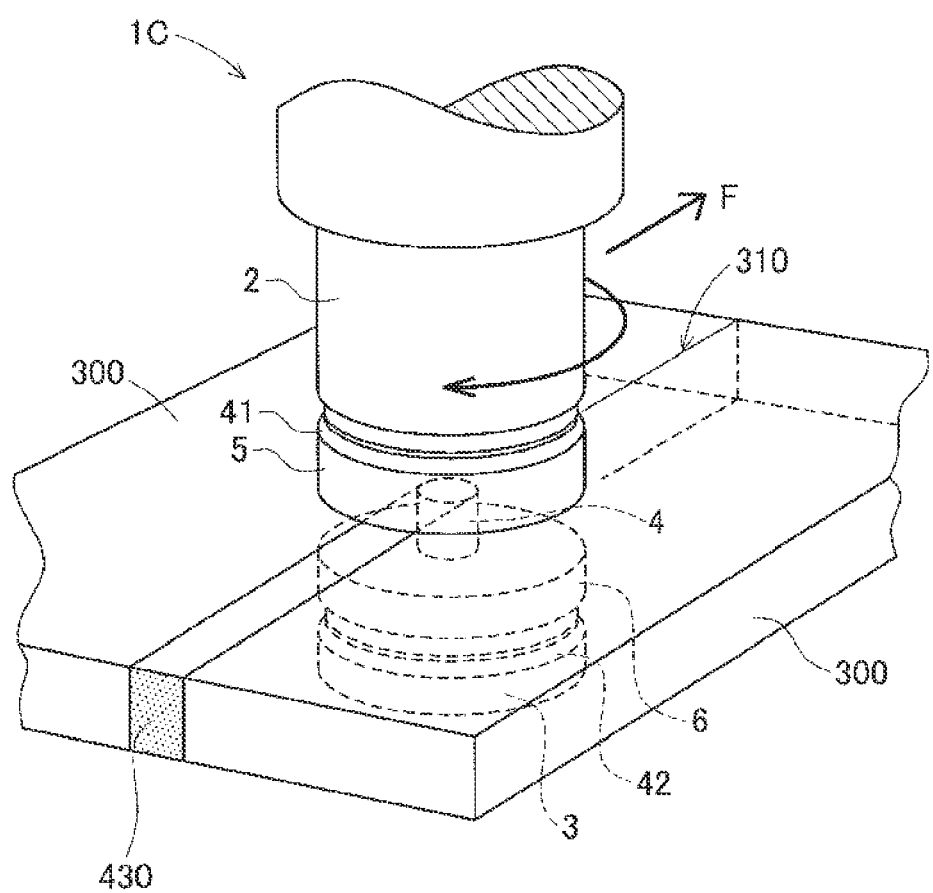
FIG. 8 is a perspective view showing a joined state during friction stir welding using the third-type rotating tool.

Accordingly, by the friction stir welding using the rotating tool 1C, the joint 310 comes to a state shown in FIG. 8 after joining. That is, the conventional weld mark 400 (see FIG. 3) does not occur in both upper and lower surfaces. Thus, both the upper and lower surfaces are obtained as flat smooth surfaces having no burrs and depressions. A thermo-mechanically affected zone 430 is formed in a narrow region through which the stirring part 4 passes, and the affected zone 430 does not widen on upper and lower surface sides.

Figure 9:
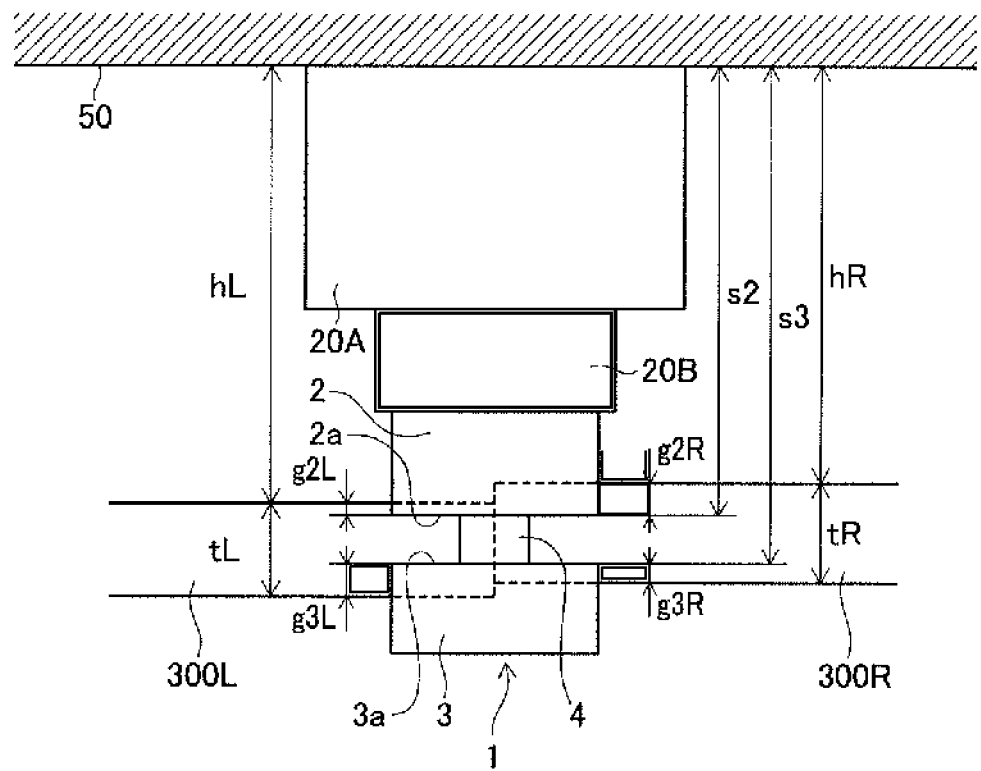
FIG. 9 is a conceptual diagram showing control to be executed for the upper rotating body and the lower rotating body of the rotating tool.

Next, the load control and the position control to be executed on the upper rotating body 2 and the lower rotating body 3 will be explained. FIG. 9 is a conceptual diagram to show the control to be performed on the upper rotating body 2 and the lower rotating body 3 of the rotating tool 1. In particular, FIG. 9 illustrates the rotating tool 1 for performing friction stir welding, seen from back in the forward-moving direction. The rotating tool 1 corresponds to the rotating tool 1A, 1B, or 1C, but the upper slide plate 5 and the lower slide plate 6 are omitted from FIG. 9 for simplicity. This omission of the upper slide plate 5 and the lower slide plate 6 also applies to FIGS. 1 and 2.

The rotating tool 1 rotates and moves to perform friction stir welding of the joint 310 at which the end faces of the workpieces 300 are in butting contact with each other. At that time, the load control is performed to cause the upper rotating body 2 and the lower rotating body 3 to pressurize the workpieces 300 from above and below at each constant load (e.g., 1 kN). In addition, the position control of the upper rotating body 2 and the lower rotating body 3 is also conducted. Accordingly, the upper slide plate 5 and the lower slide plate 6 not illustrated are displaced together with the upper rotating body 2 and the lower rotating body 3 respectively integral therewith in the thickness direction (in up and down directions in the figure) of the workpieces 300.

The member measuring units 31R and 31L provided on the right and left sides of the rotating tool 1 measure the positions of the upper surfaces of the right and left workpieces 300 through the displacement sensors 25. For facilitating understanding, the distances to be measured by the displacement sensors 25 are referred to as the distances hR and hL from the lower surface of the base 50. By using the thickness sensors 29, the thicknesses tR and tL of the right and left workpieces 300R and 300L are measured respectively.

The member measuring units 31R and 31L move ahead of the rotating tool 1. Thus, the distances hR and hL and the thicknesses tR and tL of the workpieces 300R and 300L are measured before friction stir welding is carried out. The contact elements 26 move in contact with the upper surfaces of the workpieces 300. The movable rods 27 move up and down as the heights of the upper surfaces of the workpieces 300 change. In the displacement sensors 25, at that time, respective magnetic cores move inside the coils, generating a voltage difference, based on which the displacement of each upper component surface is detected. The thickness sensors 29 generate ultrasonic pulses toward the insides of the workpieces 300 and receive reflection waves reflected by the lower surfaces of the workpieces 300. The time needed to transmit/receive the pulses or waves is detected.

A detection signal from each sensor is transmitted to the controller 30, in which the distances hR and hL and the thicknesses tR and tL are calculated based on those signals. To be specific, the upper surface position hR and the lower surface position hR+tR of the workpiece 300R and the upper surface position hL and the lower surface position hL+tL of the workpiece 300L are calculated assuming that the lower surface of the base 50 is zero. On the other hand, detection signals from the stroke sensors 23 and 24 respectively provided in the hydraulic cylinders 20A and 20B are transmitted to the controller 30, and the positions of the shoulder surfaces 2a and 3a at which the upper rotating body 2 and the lower rotating body 3 contact with the workpieces 300 are calculated. In the case where the upper slide plate 5 and/or the lower slide plate 6 are present, the positions of the shoulder surface 5a and/or the shoulder surface 6a (see FIGS. 4 to 6) at which the slide plates 5 and 6 contact with the workpieces 300 are calculated. At that time, the position of each shoulder surface 2a and 5a and the position of each shoulder surface 3a and 6a are calculated respectively as the distances s2 and s3 from the lower surface of the base 50.

The position control of the upper rotating body 2 and the lower rotating body 3 is performed to cause the upper rotating body 2 and the lower rotating body 3 to follow vertical changes of the joint 310. For instance, in the case where each workpiece 300 is a long plate having a length in a range from several meters to several tens of meters or a longer length than that range, a joint located at butt ends of the workpieces may be displaced (undulation) in up and down directions when seen in a joining direction. In such a case, the position control is performed to cause the upper rotating body 2 and the lower rotating body 3 to trace the undulating state of the joint 310.

Based on the detection signal from each sensor, the upper surface positions of the right and left workpieces 300R and 300L are calculated respectively as hR and hL and the lower surface positions of the right and left workpieces 300R and 300L are calculated respectively as hR+tR and hL+tL. Further, the position of the shoulder surface 2a of the upper rotating body 2 or the shoulder surface 5a of the upper slide plate 5 is calculated as s2 and the position of the shoulder surface 3a of the lower rotating body 3 or the shoulder surface 6a of the lower slide plate 6 is calculated as s3. Based on the calculated values, the position control of the upper rotating body 2 and the lower rotating body 3 is executed. At that time, in the present embodiment, the position control of the upper slide plate 5 and/or the lower slide plate 6 each sliding on the surfaces of the workpieces 300 is performed.

Accordingly, in the case of using the rotating tool 1A, the upper rotating body 2 is subjected to the load control and the position control, while the lower rotating body 3 is subjected to only the load control. In the case of using the rotating tool 1B, to the contrary, the upper rotating body 2 is subjected to only the load control, while the lower rotating body 3 is subjected to the load control and the position control. In the case of using the rotating tool 1C, the upper rotating body 2 and the lower rotating body 3 are subjected to both the load control and the position control. Thus, the upper rotating body 2 and the lower rotating body 3 are moved up and down to trace the undulating state of the joint 310. In that position, the friction stir welding is performed by pressurizing the workpieces 300 from above and below at nearly constant loads.

Meanwhile, the joint 310 at which the workpieces 300 are in butting relation is preferably provided with no gap as shown in FIG. 8. However, if the workpieces 300 are to be joined by a long distance, a slight gap may occur in the joint 310 as shown in FIG. 7 due to process errors. In such a case, the gap has to be filled with the plastically flowing material. However, the gap in the joint 310 could not be filled with only the material plastically flowed by the stirring part 4. This may cause joining failures.

In this respect, with the rotating tool 1A or 1B, one of the upper rotating body 2 and the lower rotating body 3 directly contacts with the workpieces 300, the material is caused to plastically flow due to heat resulting from the rotation. Since the upper rotating body 2 or the lower rotating body 3 are subjected to the load control, the shoulder surface 2a or 3a plunge into the upper surface or the lower surface by a predetermined amount. Thus, the plastically flowing material on the upper surface side or the lower surface side is pushed into the gap in the joint 310 by the shoulder surface 2a or 3a, so that the gap is filled with the material plastically flowing from the upper surface side or the lower surface side. This achieves stable joining quality. An opposite surface with which the upper slide plate 5 or the lower slide plate 6 contacts is finished as a flat smooth surface as mentioned above.

On the other hand, in the case of the rotating tool 1C, even when the joint 310 includes a stepped surface as shown in FIG. 9, it is expected to clamp the joint 310 from above and below by the shoulder surfaces 5a and 6a and join it by correcting the stepped surface. In this regard, also in the cases of the rotating tools 1A and 1B, one of the upper and lower shoulder surfaces 5a and 6a serves as a backing support surface without generating heat. It is thus expected to similarly correct the stepped surface to a certain degree.

The position control may also be executed to prevent the shoulder surface 2a of the upper rotating body 2 and the shoulder surface 3a of the lower rotating body 3 from too deeply plunging into the workpieces 300. In general, when the upper and lower rotating bodies 2 and 3 are displaced in a deeply plunging direction with respect to the workpieces 300, reactive force increases due to resistance, raising a load value. In this case, the hydraulic cylinders 20A and 20B for load adjustment are extended or retracted in predetermined directions, thereby suppressing plunging or load increasing. However, in the case of the stepped surface shown in FIG. 9, for example, the rotating bodies 2 and 3 initially contact with only one of both surfaces of each of the workpieces 300L and 300R with small resistance. Therefore, even when the right and left workpieces 300 become equal in height, respective stirred portions are hot and the material thereof softens, providing small resistance, which may cause the rotating bodies 2 and 3 to deeply plunge into the workpieces 300. In such a case, the upper rotating body 2 or the lower rotating body 3 is subjected to the position control to adjust the position of the shoulder surface 2a or 3a. In brief, the friction stir welding is performed while keeping the thickness of the joint 310 irrespective of the load value.

In the case where the shoulder surfaces 2a and 3a are allowed to plunge into the joint 310, a limited contact depth is determined in advance, based on which the position control is performed. For instance, a set value is 0.05 mm for the workpieces 300 each having a thickness of 5 mm. When the joint 310 has the step as shown in FIG. 9, the upper or lower surface of one of the workpieces 300, the one being far from the upper shoulder surface 2a or the lower shoulder surface 3a, is set as a reference position from which the set value is determined as 0.05 mm.

For example, in the case of the rotating tool 1A shown in FIG. 4, only the lower shoulder surface 3a plunges into the workpieces 300. The contact depths on the lower surface side at that time are expressed by g3R=(hR+tR)−s3 and g3L=(hL+tL)−s3. From values of the contact depths g3R and g3L, it is possible to recognize the position of the shoulder surface 3a located with respect to the workpieces 300R and 300L. Therefore, when the shoulder surface 3a plunges deeply and reaches the set value, the controller 30 executes the following control.

Firstly, the positions hR+tR and hL+tL of the lower surfaces of the right and left workpieces 300R and 300L are calculated. In the case of FIG. 9, the workpiece 300R is in a position farther from the shoulder surface 3a, i.e., in a higher position. It is thus arranged so that the contact depth g3R of the shoulder surface 3a with respect to the workpiece 300R does not exceed the set value, 0.05 mm. For this purpose, for example, when the position of the shoulder surface 3a reaches the set value, the load control is interrupted and the lower rotating body 3 is displaced in a direction to gradually return the shoulder surface 3a to the reference position. Another method is to lower a value for the load control when the position of the shoulder surface 3a reaches the set value. At that time, the lower rotating body 3 receives a larger reaction force than the load applied at a lowered load value, thereby displacing the lower rotating body 3 in the direction to move away.

In the case of the rotating tool 1B, on the other hand, only the upper surface side of the rotating tool 1B plunges into the workpieces 300. The positions of the upper surfaces of the right and left workpieces 300R and 300L are defined by hR and hL. The contact depths g2R and g2L of the shoulder surface 2a are expressed by g2R=s2−hR and g2L=s2−hL. From values of the contact depths g2R and g2L, it is possible to recognize the position of the shoulder surface 2a located with respect to the workpieces 300R and 300L. In the case of FIG. 9, the workpiece 300L is located in a position farther from the shoulder surface 2a, i.e., in a lower position. It is thus arranged so that the contact depth g2L of the shoulder surface 2a with respect to the workpiece 300L does not exceed the set value 0.05 mm. For this purpose, when the position of the shoulder surface 2a reaches the set value, the load control is interrupted and the upper rotating body 2 is displaced in a direction to gradually return the shoulder surface 2a to the reference position. An alternative is to lower a value for the load control, so that the upper rotating body 2 receives a larger reaction force than the load, thereby displacing the upper rotating body 2 in the direction to move away.

According to the friction stir welding apparatus 10 in the present embodiment, one or both of the upper rotating body 2 and the lower rotating body 3 are provided with the upper slide plate 5 and/or the lower slide plate 6 as shown in the rotating tools 1A, 1B, and 1C. This configuration enables joining of the workpieces 300 without generating the weld mark 400 in the surface with which the upper slide plate 5 or the lower slide plate 6 is placed in contact. Accordingly, there is no need to perform a surface finishing using a grinder or the like after joining. Such a surface can be substantially directly provided as a product surface. Further, since the depressions 403 are not generated, the joint 310 of the workpieces 300 does not need to be formed with a protrusion in advance. This can reduce a machining cost and save a relevant work, resulting in a reduced product cost.

The present invention is not limited to the above embodiment and may be embodied in other specific forms without departing from the essential characteristics thereof.

REFERENCE SIGNS LIST 1 (1A, 1B, 1C) Rotating tool
2 Upper rotating body
3 Lower rotating body
4 Stirring part
5 Upper slide plate
6 Lower slide plate
10 Friction stir welding apparatus
16 Rotating main rod
20A, 20B Hydraulic cylinder
21A, 21B Hydraulic device
25 Displacement sensor
26 Contact element
29 Thickness sensor
30 Controller
41, 42 Thrust bearing
300 Workpiece
310 Joint

The invention claimed is:

1. A friction stir welding apparatus comprising a rotating tool including:
   an upper rotating body arranged to be adjustable in position in an axial direction by an actuator for upper rotating body;
   a lower rotating body formed integral with a rotating main rod extending through the upper rotating body and arranged to be adjustable in position in the axial direction by an actuator for lower rotating body; and
   a stirring part formed in the rotating main rod,
   the apparatus being configured such that the upper rotating body and the lower rotating body clamp therebetween a joint of members to be joined placed with end faces of the members butting each other and the stirring part is rotated to stir the joint by frictional heat to join the members,
   wherein the rotating tool includes an upper slide plate attached, through a thrust bearing, to an end portion of the upper rotating body facing an end portion of the lower rotating body, and/or a lower slide plate attached, through a thrust bearing, to the end portion of the lower rotating body facing the end portion of the upper rotating body,
   when the upper rotating body includes the upper slide plate attached thereto, the upper slide plate contacts an upper surface of the members and the upper rotating body does not contact the upper surface of the members, such that rotation of the upper rotating body is not directly imparted to the members, and
   when the lower rotating body includes the lower slide plate attached thereto, the lower slide plate contacts a lower surface of the members and the lower rotating body does not contact the lower surface of the members, such that rotation of the lower rotating body is only imparted to the members by the stirring part.

2. The friction stir welding apparatus according to claim 1, further comprising:
   a load sensor to detect loads on the upper rotating body and the lower rotating body;

a stroke sensor to detect positions of the upper rotating body and the lower rotating body;

a displacement sensor to measure positions of the members to be joined; and a controller to execute load control to adjust the loads on the upper rotating body and the lower rotating body while clamping therebetween the joint and position control to adjust the positions of the upper rotating body and the lower rotating body.

3. The friction stir welding apparatus according to claim 2, wherein the position sensor for measuring the positions of the members to be joined includes a displacement sensor to measure positions of upper surfaces of the members to be joined, when the upper slide plate of the rotating tool is attached to only the upper rotating body, the controller drives each of the actuators based on information from each of the sensors to perform the load control and the position control on the upper rotating body and perform only the load control on the lower rotating body.

4. The friction stir welding apparatus according to claim 2, wherein the position sensor for measuring the positions of the members to be joined includes a displacement sensor to measure positions of upper surfaces of the members to be joined and a thickness sensor to measure a thickness of the joint of the members to be joined, when the lower slide plate of the rotating tool is attached to only the lower rotating body, the controller drives each of the actuators based on information from each of the sensors to perform the load control and the position control on the lower rotating body and perform only the load control on the upper rotating body.

5. The friction stir welding apparatus according to claim 2, wherein the position sensor for measuring the positions of the members to be joined includes a displacement sensor to measure positions of upper surfaces of the members to be joined and a thickness sensor to measure a thickness of the joint of the members to be joined, when the slide plates of the rotating tool are attached to the upper rotating body and the lower rotating body, the controller drives each of the actuators based on information from each of the sensors to perform the load control and the position control on the upper rotating body and the lower rotating body.

6. The friction stir welding apparatus according to claim 2, wherein the position control to be performed by the controller is configured to change the positions of the upper rotating body and the lower rotating body to follow the joint of the members to be joined in up-and-down directions.

7. The friction stir welding apparatus according to claim 6, wherein the position control to be performed by the controller is configured to adjust the position of the upper rotating body or the lower rotating body allowed to further plunge into the joint of the members to be joined.

8. The friction stir welding apparatus according to claim 3, wherein the position control to be performed by the controller is configured to change the positions of the upper rotating body and the lower rotating body to follow the joint of the members to be joined in up-and-down directions.

9. The friction stir welding apparatus according to claim 4, wherein the position control to be performed by the controller is configured to change the positions of the upper rotating body and the lower rotating body to follow the joint of the members to be joined in up-and-down directions.

10. The friction stir welding apparatus according to claim 5, wherein the position control to be performed by the controller is configured to change the positions of the upper rotating body and the lower rotating body to follow the joint of the members to be joined in up-and-down directions.

* * * * *